United States Patent
Lee et al.

(10) Patent No.: US 9,426,271 B2
(45) Date of Patent: Aug. 23, 2016

(54) MOBILE ELECTRONIC DEVICE CAPABLE OF SWITCHING USER INTERFACES AND METHOD THEREOF

(71) Applicant: Maetay Precision Co., Ltd., New Taipei (TW)

(72) Inventors: Yueh-Shing Lee, Taoyuan (TW); Hsun-Chih Tsai, New Taipei (TW)

(73) Assignee: Maetay Precision Co., Ltd., New Taipei (TW)

( * ) Notice: Subject to any disclaimer, the term of this patent is extended or adjusted under 35 U.S.C. 154(b) by 0 days.

(21) Appl. No.: 14/698,856

(22) Filed: Apr. 29, 2015

(65) Prior Publication Data

US 2015/0319289 A1 Nov. 5, 2015

(30) Foreign Application Priority Data

Apr. 30, 2014 (TW) .............................. 103115614 A

(51) Int. Cl.
*H04B 1/38* (2015.01)
*H04M 1/725* (2006.01)
*H04M 1/60* (2006.01)

(52) U.S. Cl.
CPC ...... *H04M 1/72519* (2013.01); *H04M 1/72569* (2013.01); *H04M 1/605* (2013.01); *H04M 2250/12* (2013.01)

(58) Field of Classification Search
CPC ..... G06F 3/167; G06F 3/0488; G06F 9/4443; G06F 3/16; G10L 15/26; G10L 15/30; G10L 15/265; G10L 2015/228; G10L 2015/088; H04W 88/02; H04W 4/00; H04W 4/18; H04M 2250/22; H04M 1/72519; H04M 2250/12; H04M 1/605; H04M 1/72522

USPC ....................... 455/566, 567, 569.1, 563, 418
See application file for complete search history.

(56) References Cited

U.S. PATENT DOCUMENTS

| | | | | |
|---|---|---|---|---|
| 2007/0249406 | A1* | 10/2007 | Andreasson | H04M 1/656 455/563 |
| 2010/0312547 | A1* | 12/2010 | Van Os | G06F 3/167 704/9 |
| 2011/0014952 | A1* | 1/2011 | Minton | H04M 1/271 455/566 |
| 2013/0325484 | A1* | 12/2013 | Chakladar | G10L 15/26 704/275 |
| 2014/0303971 | A1* | 10/2014 | Yi | H04M 1/605 704/233 |

FOREIGN PATENT DOCUMENTS

| | | |
|---|---|---|
| TW | 201112228 | 4/2011 |
| TW | 201329958 | 7/2013 |
| TW | 201405546 | 2/2014 |

* cited by examiner

*Primary Examiner* — Olumide T Ajibade Akonai
(74) *Attorney, Agent, or Firm* — Winston Hsu; Scott Margo

(57) ABSTRACT

A mobile electronic device includes a storage unit, a display module, an audio speaker module, a sound receiving module and a control unit. The storage unit is for storing at least one character data. The display module is for selectively displaying a first user interface or a second user interface. The audio speaker module is for playing a voice. The sound receiving module is for receiving the voice played by the audio speaker module. The control unit is coupled to the storage unit, the display module and the sound receiving module. The control unit is for generating a character signal corresponding to the voice and controlling the display module to switch from the first user interface to the second user interface when determining the character signal matches the at least one character data.

7 Claims, 5 Drawing Sheets

MOBILE ELECTRONIC DEVICE CAPABLE OF SWITCHING USER INTERFACES AND METHOD THEREOF

BACKGROUND OF THE INVENTION

1. Field of the Invention

The present invention relates to a mobile electronic device and a method thereof, and more particularly, to a mobile electronic device capable of switching user interfaces and a method thereof.

2. Description of the Prior Art

Recently, mobile electronic devices, such as smart phones, have been widely used in people's daily life. Most of the mobile electronic devices have touch screens for displaying a graphical user interface, so that a user performs touch control commands, such as dialing phone numbers, web browsing and so on, by this user interface. Generally speaking, when the user wants to key in the numbers during the call, it is required to switch from the graphical user interface of calling to the graphical user interface with numeric keypad shown thereon by the touch gesture for keying in numbers. For example, when the user needs to key in any number, it needs to tap a certain icon shown on the graphical user interface of calling for switching from the graphical user interface of calling to the graphical user interface with numeric keypad shown thereon for keying in numbers. Sometimes, it is not easy for users to find the icon of numeric keypad. It results in inconvenience in use.

SUMMARY OF THE INVENTION

Accordingly, the present invention provides a mobile electronic device capable of switching user interfaces and a method thereof for solving the above drawbacks.

According to an embodiment of the present invention, a mobile electronic device capable of switching user interface includes a storage unit, a display module, an audio speaker module, a sound receiving module and a control unit. The storage unit is for storing at least one data. The display module is for selectively displaying a first user interface or a second user interface. The audio speaker module is for playing a voice. The sound receiving module is for receiving the voice played by the audio speaker module. The control unit is coupled to the storage unit, the display module and the sound receiving module. The control unit is for generating a signal according to the voice received by the audio speaker module and determining whether the signal matches the at least one data. The control unit is further for controlling the display module to switch from the first user interface to the second user interface when the signal matches the at least one data.

According to another embodiment of the present invention, a method for switching user interfaces of a mobile electronic device includes utilizing a storage unit for storing at least one data; utilizing a display module for selectively displaying a first user interface or a second user interface; utilizing a audio speaker module for playing a voice; utilizing a sound receiving module for receiving the voice played by the audio speaker module; utilizing a control unit for generating a signal according to the voice received by the audio speaker module and determining whether the signal matches the at least one data; and when the control unit determines the signal matches the at least one data, the control unit controlling the display module to switch from the first user interface to the second user interface.

In summary, the mobile electronic device of the present invention utilizes the control unit to transfer the voice played by the audio speaker module into the signal and determines whether the signal matches the at least one data stored in the storage unit. When the signal matches the at least one data, the control unit controls the display module to switch user interfaces from the first user interface to the second user interface. In such a manner, the mobile electronic device of the present invention is capable of automatically switching the first user interface (e.g. the user interface in the dialing state) to the second user interface (e.g. the user interface with digit keys) according to the voice played by the audio speaker module (e.g. when the voice played by the audio speaker module includes extension, input, number, extension number and soon). In other words, the present invention does not require manual operation of the first user interface (e.g. touching the keyboard icon on the first user interface) for activating the second user interface to key the extension number. As a result, mobile electronic device of the present invention enhances convenience in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
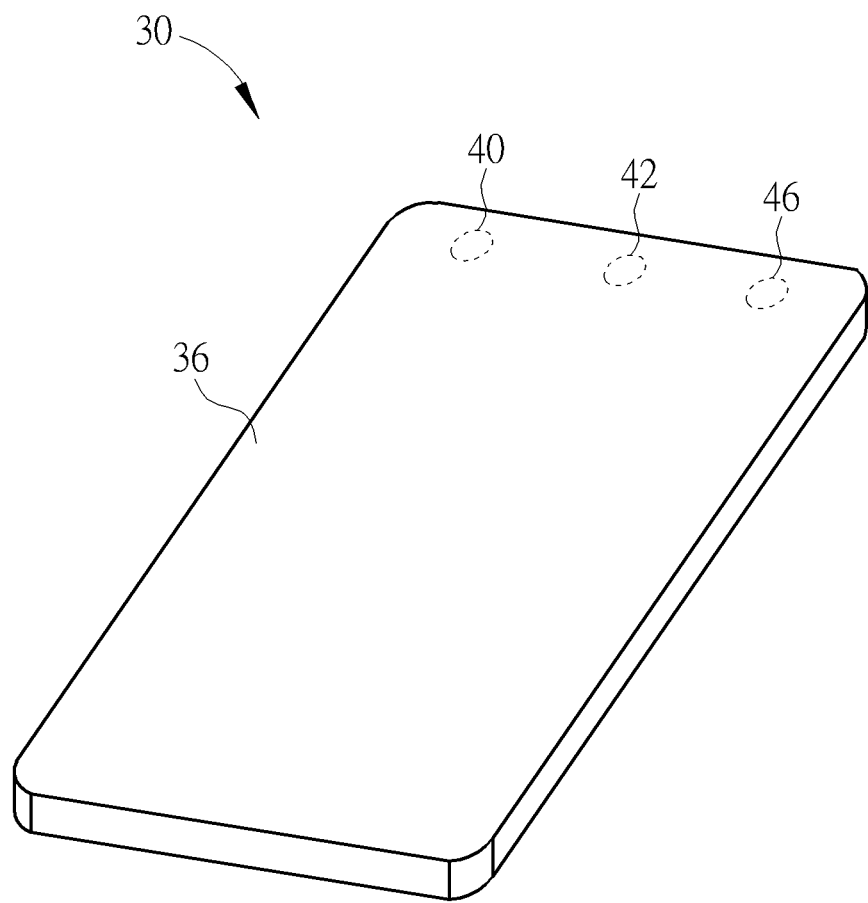
FIG. 1 is a schematic diagram of a mobile electronic device according to an embodiment of the present invention.
Figure 2:
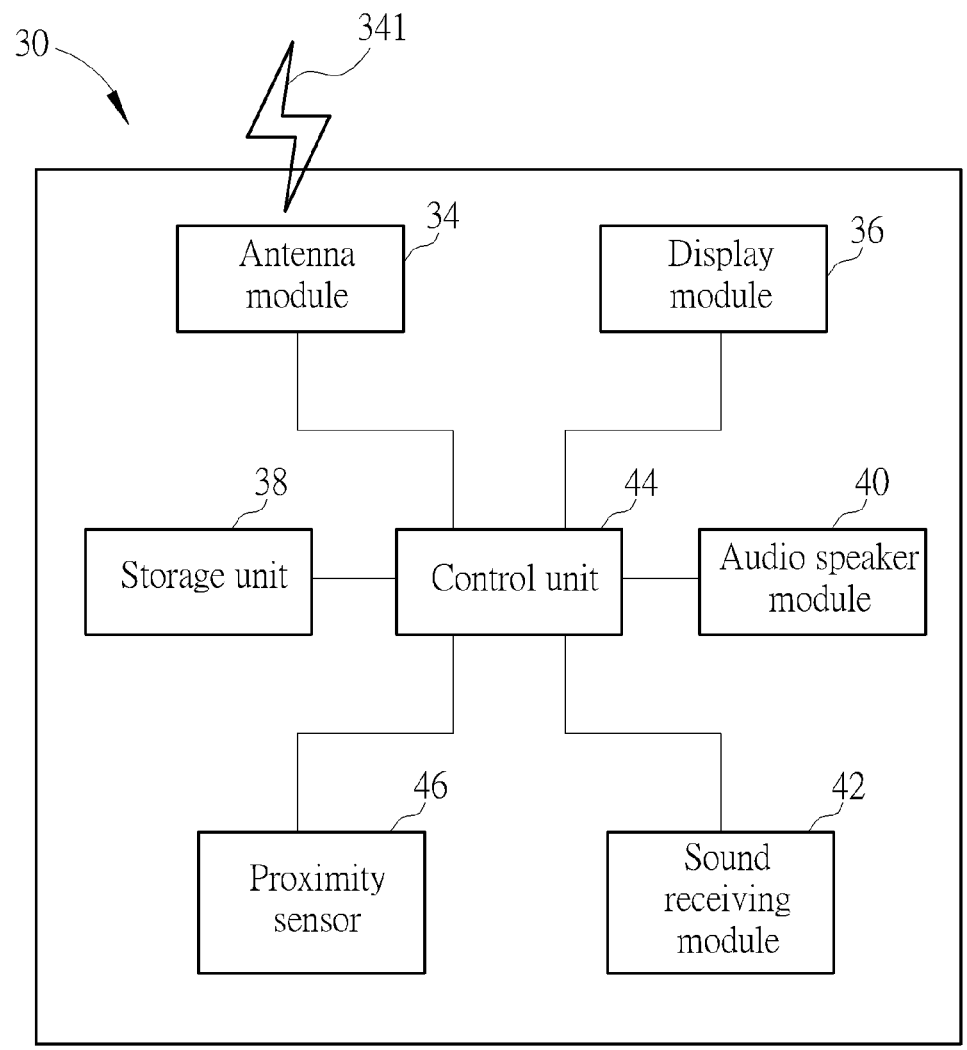
FIG. 2 is a functional block diagram of the mobile electronic device according to the embodiment of the present invention.
Figure 3:
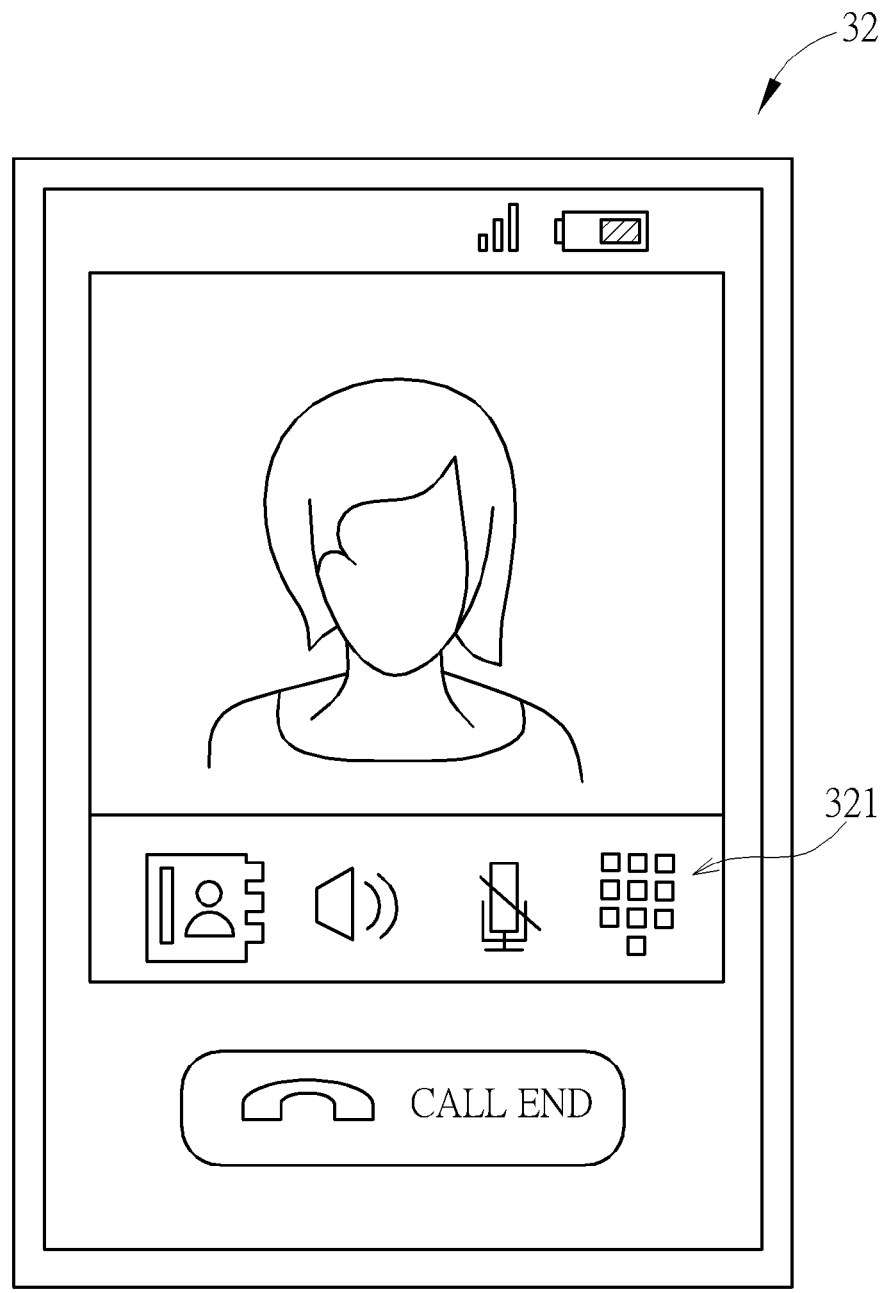
FIG. 3 is a diagram of a first user interface shown on the mobile electronic device 30 according to the embodiment of the present invention.

Please refer to FIG. 1 to FIG. 3. FIG. 1 is a schematic diagram of a mobile electronic device 30 according to an embodiment of the present invention. FIG. 2 is a functional block diagram of the mobile electronic device 30 according to the embodiment of the present invention. FIG. 3 is a diagram of a first user interface 32 shown on the mobile electronic device 30 according to the embodiment of the present invention. As shown in FIG. 1 to FIG. 3, the mobile electronic device 30 includes an antenna module 34 and a display module 36. The antenna module 34 is used for transmitting an antenna signal 341. When the antenna module 34 transmits the antenna signal 341, the display module 36 displays the first user interface 32 as shown in FIG. 3.

In this embodiment, the mobile electronic device 30 is a smart phone, the display module 36 is a touch panel, but implementations of the mobile electronic device 30 and the display module 36 are not limited to those illustrated in figures in this embodiment. When the antenna module 34 of the smart phone (i.e. the mobile electronic device 30) transmits the antenna signal 341, i.e. when the smart phone (i.e. the mobile electronic device 30) is in a dialing state, the display module 36 is used for displaying the first user interface 32 as shown in FIG. 3. In other words, the first user interface 32 is a user interface corresponding to the dialing state of the mobile electronic device 30.

Figure 4:
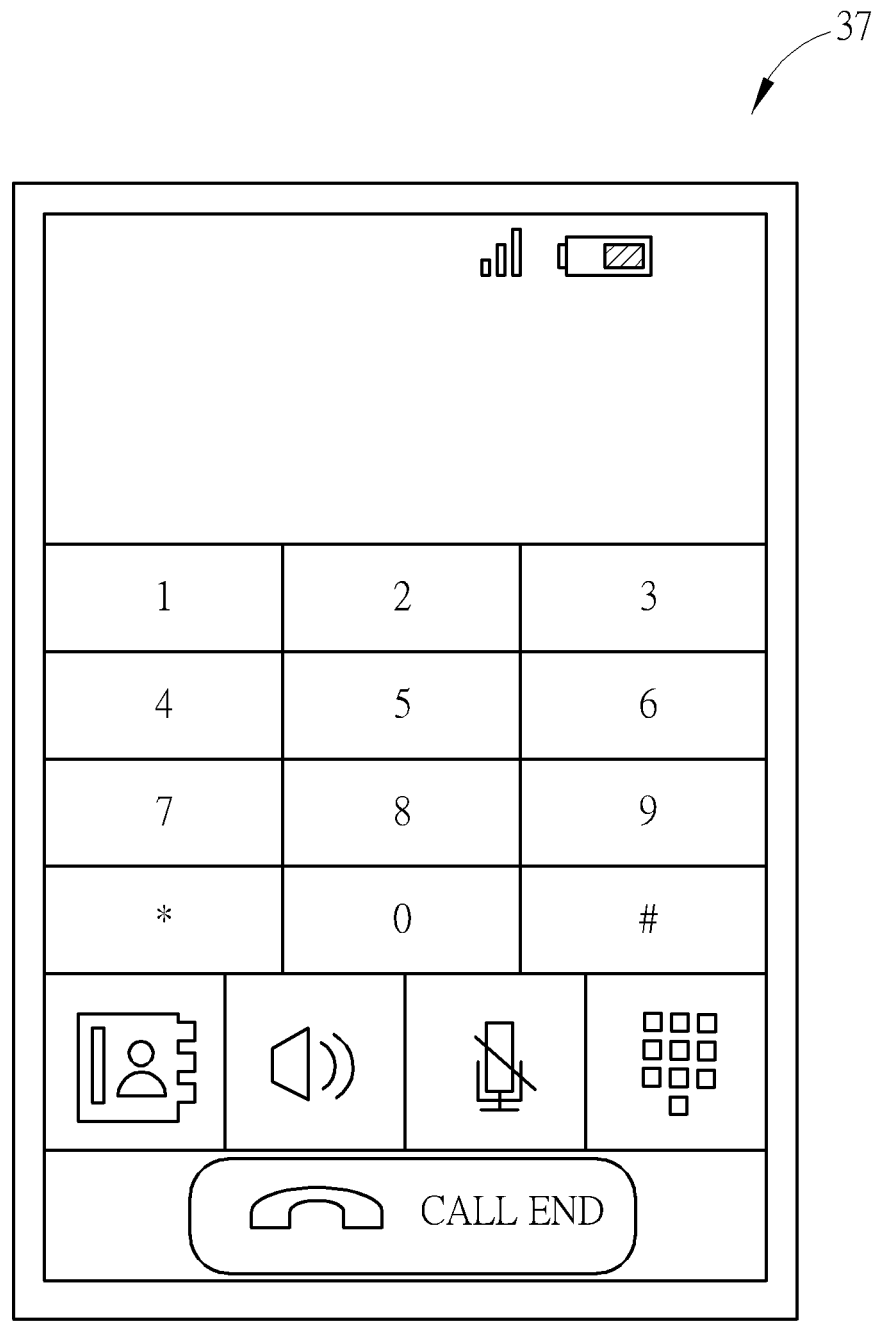
FIG. 4 is a diagram of a second user interface shown on the mobile electronic device 30 according to the embodiment of the present invention.

Please refer to FIG. 1 to FIG. 4. FIG. 4 is a diagram of a second user interface 37 shown on the mobile electronic device 30 according to the embodiment of the present invention. As shown in FIG. 1 to FIG. 4, the mobile electronic device 30 includes a storage unit 38 for storing at least one data. For example, in this embodiment, the storage unit 38 can be a hardware disc, a flash memory and so on. The at least one data can be sound data including extension, number, extension number and so on, and the present invention is not limited thereto. In addition, the mobile electronic device 30 further includes an audio speaker module 40 and a sound receiving module 42. The audio speaker module 40 is used for playing a voice, and the sound receiving module 42 is used for receiving the voice played by the audio speaker module 40. In this embodiment, the audio speaker module 40 can be a speaker component, and the sound receiving module 42 can be a microphone component. As shown in FIG. 1, the sound receiving module 42 (i.e. the microphone component) is near the audio speaker module 40 (i.e. the speaker component) for facilitating to receive the voice played by the audio speaker module 40. As shown in FIG. 4, the second user interface 37 has digit keys for the user to key the extension number during the phone call. In other words, the second user interface 37 is a user interface corresponding to a keying extension state of the mobile electronic device 30.

Furthermore, the mobile electronic device 30 further includes a control unit 44 coupled to the antenna module 34, the display module 36, the audio speaker module 40 and the sound receiving module 42. When the sound receiving module 42 receives the voice played by the audio speaker module 40, the control unit 44 generates a signal according to the voice received by the sound receiving module 42. In this embodiment, the control unit 44 is a Central Processor Unit, CPU, but the present invention is not limited thereto. In addition, the mobile electronic device 30 further includes a proximity sensor 46 coupled to the control unit 44 and for sensing an object. For example, when the object, e.g. a face, approaches the proximity sensor 46 within a specific distance, the proximity sensor 46 senses the object and thus outputs a detecting signal.

For example, when the mobile electronic device 30 is in the dialing state, the mobile electronic device 30 is oriented aside of the user's face. Meanwhile, the proximity sensor 46 senses the user's face, so that the control unit 44 of the mobile electronic device 30 is capable of performing instructions, such as switching the user interfaces and so on, according to whether the proximity sensor 46 senses the object. In this embodiment, the proximity sensor 46 is near the sound receiving module 42 for sensing the object near the mobile electronic device 30.

Figure 5:
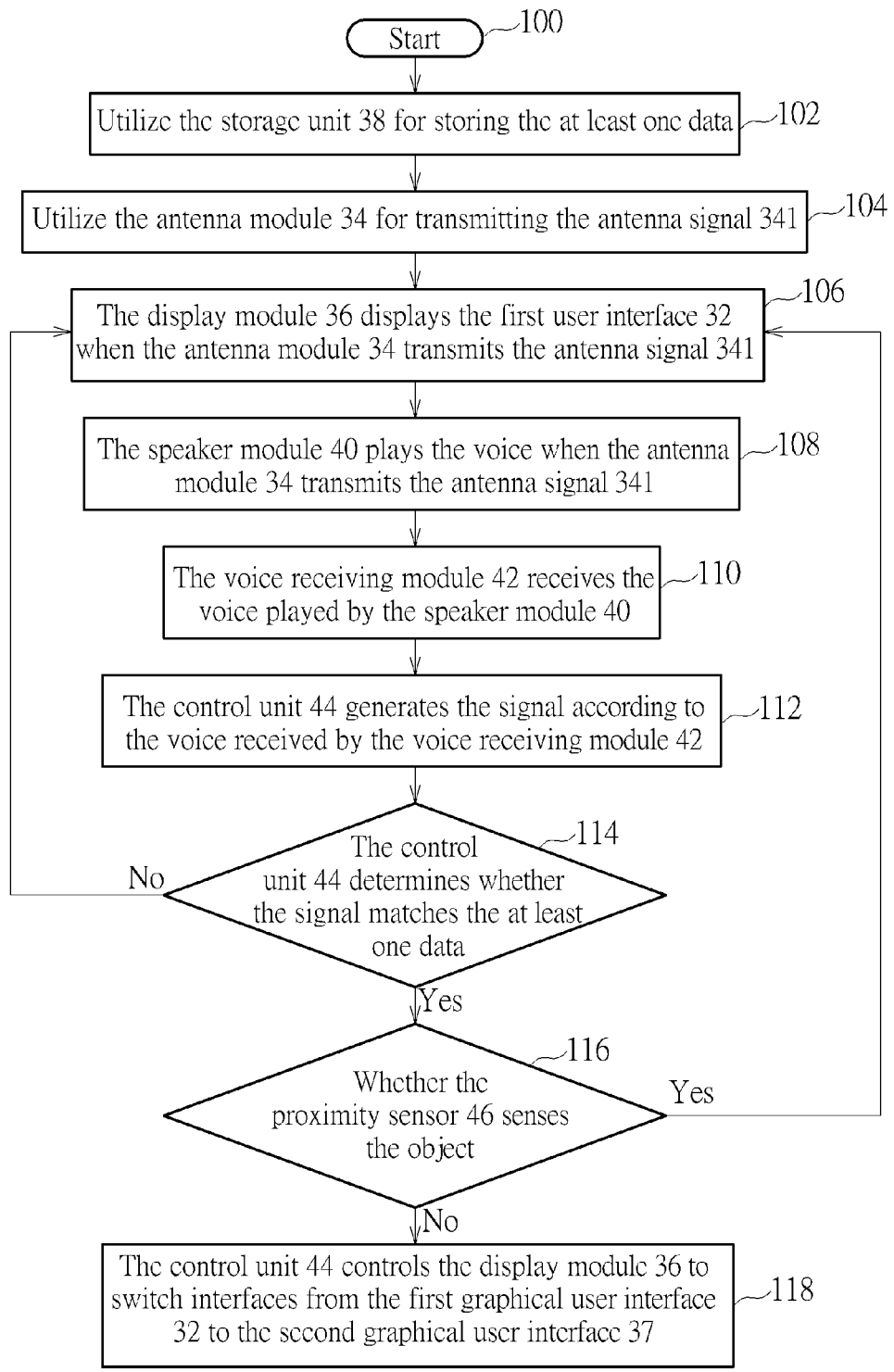
FIG. 5 is a flow chart illustrating method for switching the user interfaces shown on the mobile electronic device according to the embodiment of the present invention.

Please refer to FIG. 1 to FIG. 5. FIG. 5 is a flow chart illustrating method for switching the user interfaces shown on the mobile electronic device 30 according to the embodiment of the present invention. As shown in FIG. 5, the method includes following steps:

Step 100: Start.

Step 102: Utilize the storage unit 38 for storing the at least one data.

Step 104: Utilize the antenna module 34 for transmitting the antenna signal 341.

Step 106: The display module 36 displays the first user interface 32 when the antenna module 34 transmits the antenna signal 341.

Step 108: The audio speaker module 40 plays the voice when the antenna module 34 transmits the antenna signal 341.

Step 110: The sound receiving module 42 receives the voice played by the audio speaker module 40.

Step 112: The control unit 44 generates the signal according to the voice received by the sound receiving module 42.

Step 114: The control unit 44 determines whether the signal matches the at least one data; if yes, go to Step 116; if not, return to Step 106.

Step 116: Whether the proximity sensor 46 senses the object; if yes, return to Step 106; if not, go to Step 118.

Step 118: The control unit 44 controls the display module 36 to switch interfaces from the first graphical user interface 32 to the second graphical user interface 37.

The detailed descriptions for above-mentioned method are provided as follows. The at least one data, such as sound data including extension, input, number, extension number and so on, is stored in the storage unit 38 of the mobile electronic device 30 (Step 102). When the antenna module 34 of the mobile electronic device 30 transmits the antenna signal 341 (Step 104), the display module 36 of the mobile electronic device 30 displays the first user interface 32 shown in FIG. 3 (Step 106), so as to remind the user of the mobile electronic device 30 being in the dialing state. When the user utilizes the mobile electronic device 30 to make a call, the audio speaker module 40 is used for playing the voice (Step 108). In practical application, the voice can be a voice mail for reminding the user of the extension number, but the present invention is not limited thereto.

When the audio speaker module 40 plays the voice, the sound receiving module 42 is used for receiving the voice played by the audio speaker module 40 (Step 110). Meanwhile, the control unit 44 coupled to the sound receiving module 42 is capable of generating the signal according to the voice received by the sound receiving module 42 (Step 112). In such a manner, the control unit 44 can be further used for determining whether the signal matches the at least one data stored in the storage unit 38 (Step 114). When the control unit 44 determines that the signal does not match the at least one data, i.e. when the voice played by the audio speaker module 40 does not relate to any key word with respect to the at least one data, such as sound data comprising extension, input, number, extension number and so on, the control unit 44 controls the display module 36 to display the first user interface 32. In other words, the control unit 44 does not switch the user interfaces when determining that the signal does not match the at least one data. On the other hand, when the control unit 44 determines the signal matches the at least one data, i.e. when the voice played by the audio speaker module 40 relates to any key word with respect to the at least one data, the control unit 44 can further determine whether the proximity sensor 46 senses the object (Step 116).

When the control unit 44 determines the signal matches the at least one data and the proximity sensor 46 does not sense the object, i.e. when the voice played by the audio speaker module 40 relates to any key word with respect to the at least one data and the face (i.e. the object) is away from the mobile electronic device 30, the control unit 44 controls the display module 36 to switch user interfaces from the first user interface 32 to the second user interface 37 (Step 118). In this embodiment, the second user interface 37 can be a digit-input interface, so that the user directly utilizes the second user interface 37 for keying digits. Accordingly, it does not need the user to touch the first user interface 32 (e.g. touching a keyboard icon 321 on the first user interface 32) for activating the second user interface 37 to key the extension number. In other words, the mobile electronic device 30 of the present invention utilizes the control unit 44 for switching the user interfaces from the first user interface 32 to the second user interface 37 when the signal matches the at least one data stored in the storage unit 38, i.e. the present invention does not require the user to manually operate the first user interface 32, e.g. touching a keyboard icon 321 on the first user interface 32, for activating the second user interface 37 to key the extension number. As a result, the mobile electronic device 30 of the present invention enhances convenience in use.

It should be noticed that the control unit 44 of the mobile electronic device 30 controls the display module 36 to display a black interface and pause touch control function when the control unit 44 determines the signal matches the at least one data and the proximity sensor 46 senses the object. In other words, when the voice played by the audio speaker module 40 relates to any key word with respect to the at least one data and the face (i.e. the object) is close to the mobile electronic device 30, the control unit 44 will control the display module 36 to pause the touch control function and not to activate the second user interface 37, so as to prevent the face (i.e. the object) from error call due to accidentally touch the second user interface 37.

Compared to the prior art, the mobile electronic device of the present invention utilizes the control unit to transfer the voice played by the audio speaker module into the signal and determines whether the signal matches the at least one data stored in the storage unit. When the signal matches the at least one data, the control unit controls the display module to switch user interfaces from the first user interface to the second user interface. In such a manner, the mobile electronic device of the present invention is capable of automatically switching the first user interface (e.g. the user interface in the dialing state) to the second user interface (e.g. the user interface with digit keys) according to the voice played by the audio speaker module (e.g. when the voice played by the audio speaker module includes extension, input, number, extension number and so on). In other words, the present invention does not require manual operation of the first user interface (e.g. touching the keyboard icon on the first interface) for activating the second user interface to key the extension number. As a result, mobile electronic device of the present invention enhances convenience in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile electronic device capable of switching user interfaces, comprising:
    a storage unit for storing at least one data;
    a display module for selectively displaying a first user interface or a second user interface;
    an audio speaker module for playing sound;
    a sound receiving module for receiving the voice played by the audio speaker module;
    a control unit coupled to the storage unit, the display module and the sound receiving module, the control unit being for generating a signal according to the voice received by the audio speaker module and determining whether the signal matches the at least one data, the control unit being further for controlling the display module to switch from the first user interface to the second user interface when the signal matches the at least one data; and
    a proximity sensor coupled to the control unit and for sensing an object, the control unit being further for controlling the display module to switch from the first user interface to the second user interface when the signal matches the at least one data and the proximity sensor does not sense the object.

2. The mobile electronic device of claim 1, wherein the proximity sensor is near the sound receiving module.

3. The mobile electronic device of claim 1, wherein the least one data is sound data comprising extension, input, number or extension number.

4. The mobile electronic device of claim 1, further comprising:
    an antenna module for transmitting an antenna signal, wherein the display module is for displaying the first user interface and the audio speaker module plays the voice when the antenna module transmits the antenna signal.

5. The mobile electronic device of claim 1, wherein the sound receiving module is near the audio speaker module.

6. A method for switching user interface of a mobile electronic device, comprising:
    utilizing a storage unit for storing at least one data;
    utilizing a display module for selectively displaying a first user interface or a second user interface;
    utilizing an audio speaker module for playing a voice;
    utilizing a sound receiving module for receiving the voice played by the audio speaker module;
    utilizing a control unit for generating a signal according to the voice received by the sound receiving module and determining whether the signal matches the at least one data;
    when the control unit determines the signal matches the at least one data, the control unit controlling the display module to switch from the first user interface to the second user interface; and
    utilizing a proximity sensor for sensing an object, when the signal matches the at least one data and the proximity sensor does not sense the object, the control unit controlling the display module to switch from the first user interface to the second user interface.

7. The method of claim 6, further comprising:
utilizing an antenna module for transmitting an antenna signal, wherein when the antenna module transmits the antenna signal, the display module displays the first user interface and the audio speaker module plays the voice.

* * * * *